(12) United States Patent
Tsai

(10) Patent No.: US 6,567,676 B1
(45) Date of Patent: May 20, 2003

(54) DIAL COMMUNICATION SYSTEM OF A STEERING WHEEL OF AN AUTOMOBILE

(75) Inventor: Huo-Lu Tsai, Taichung Hsien (TW)

(73) Assignee: Complex Instrument Technology Corp. (TW)

( * ) Notice: Subject to any disclaimer, the term of this patent is extended or adjusted under 35 U.S.C. 154(b) by 372 days.

(21) Appl. No.: 09/651,292

(22) Filed: Aug. 30, 2000

(51) Int. Cl.$^7$ .............................. H04M 1/23; H04B 1/38
(52) U.S. Cl. .................... 455/569; 455/90; 379/428; 379/58
(58) Field of Search ........................ 455/90, 550, 569, 455/99, 345, 575, 88; 379/59, 58, 428, 60

(56) References Cited

U.S. PATENT DOCUMENTS

| | | | | |
|---|---|---|---|---|
| 4,455,454 A | * | 6/1984 | Umebayashi | 455/556 |
| 4,698,838 A | * | 10/1987 | Ishikawa et al. | 455/569 |
| 4,850,015 A | * | 7/1989 | Martin | 379/446 |
| 5,319,803 A | * | 6/1994 | Allen | 455/566 |
| 5,608,781 A | * | 3/1997 | Seiderman | 455/410 |
| 5,659,887 A | * | 8/1997 | Ooe | 455/575 |

* cited by examiner

Primary Examiner—Nguyen T. Vo
Assistant Examiner—Kamran Afshar
(74) Attorney, Agent, or Firm—Connolly Bove Lodge & Hutz LLP

(57) ABSTRACT

A dial communication system of a steering wheel of an automobile includes a steering wheel having an annular frame, and a dial communication device mounted on the annular frame of the steering wheel and having a dialogue member and a dial member each secured on the annular frame of the steering wheel. In such a manner, the dial communication device is installed on the steering wheel so that a driver's one hand holding the steering wheel can synchronously operate the dialogue member and the dial member of the dial communication device to perform functions of dial and dialogue.

5 Claims, 3 Drawing Sheets

DIAL COMMUNICATION SYSTEM OF A STEERING WHEEL OF AN AUTOMOBILE

BACKGROUND OF THE INVENTION

1. Field of the Invention

The present invention relates to a dial communication system, and more particularly to a dial communication system of a steering wheel of an automobile co-operating with a mobile telephone having a hand-free receiver.

2. Description of the Related Art

A conventional mobile telephone having a hand-free receiver in accordance with the prior art is mounted in an automobile so that the driver in the automobile can perform the dialogue function during driving the steering wheel without having to hold the mobile telephone.

However, the driver still has to press the press buttons on the mobile telephone for performing a dial function whereby the driver's hand has to leave the steering wheel so as to press the press buttons while the driver has to turn around his head to see the numbers on the press buttons for dialing the correct telephone numbers so that the drive's view of sight will deviate the direction of travel of the automobile, thereby easily causing danger to the driver during driving.

SUMMARY OF THE INVENTION

In accordance with one aspect of the present invention, there is provided a dial communication system of a steering wheel of an automobile comprising:

- a steering wheel having an annular frame; and
- a dial communication device mounted on the annular frame of the steering wheel and including a dialogue member and a dial member each secured on the annular frame of the steering wheel;
- wherein, the dial communication device is installed on the steering wheel so that a driver's one hand holding the steering wheel can synchronously operate the dialogue member and the dial member of the dial communication device to perform functions of dial and dialogue.

In such a manner, the dial communication device is installed on the steering wheel whereby the driver can hold the steering wheel, and can press the press buttons and the control button synchronously so as to perform the dial function so that the driver's hand does not have to leave the steering wheel for performing the dial function, thereby greatly enhancing the safety during driving the steering wheel.

In accordance with another aspect of the present invention, there is provided a dial communication system of a steering wheel of an automobile comprising:

- a steering wheel having an annular frame; and
- a dial member secured on the annular frame of the steering wheel;
- wherein, the dial member is installed on the steering wheel so that a driver's one hand holding the steering wheel can operate the dial member synchronously to perform a dial function.

The dial member is connected to a main frame by wires or in a wireless manner, and the main frame is connected to a dialogue member and a mobile telephone.

Further benefits and advantages of the present invention will become apparent after a careful reading of the detailed description with appropriate reference to the accompanying drawings.

DETAILED DESCRIPTION OF THE INVENTION

Figure 1:
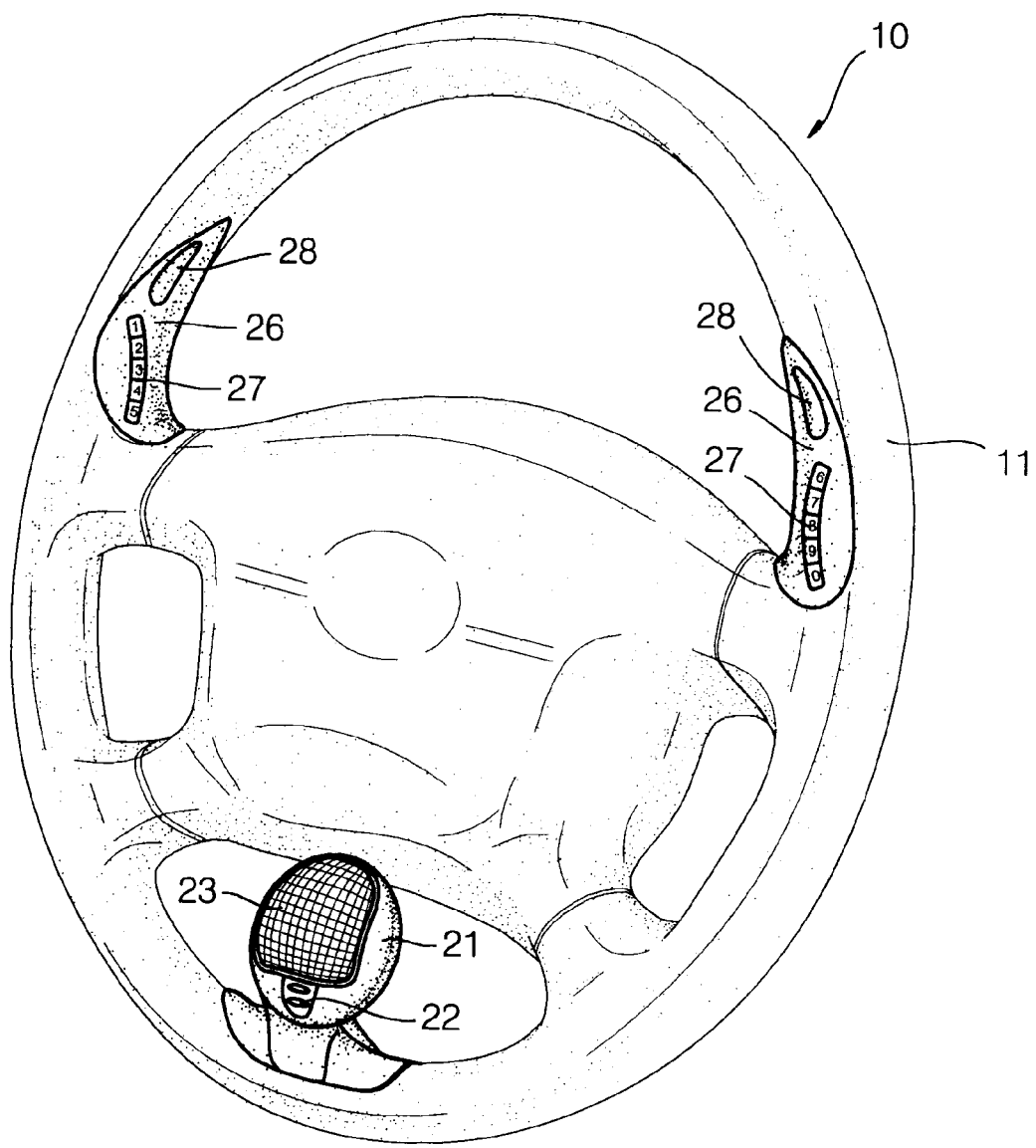
FIG. 1 is a perspective view of a dial communication system of a steering wheel of an automobile in accordance with the present invention.
Figure 2:
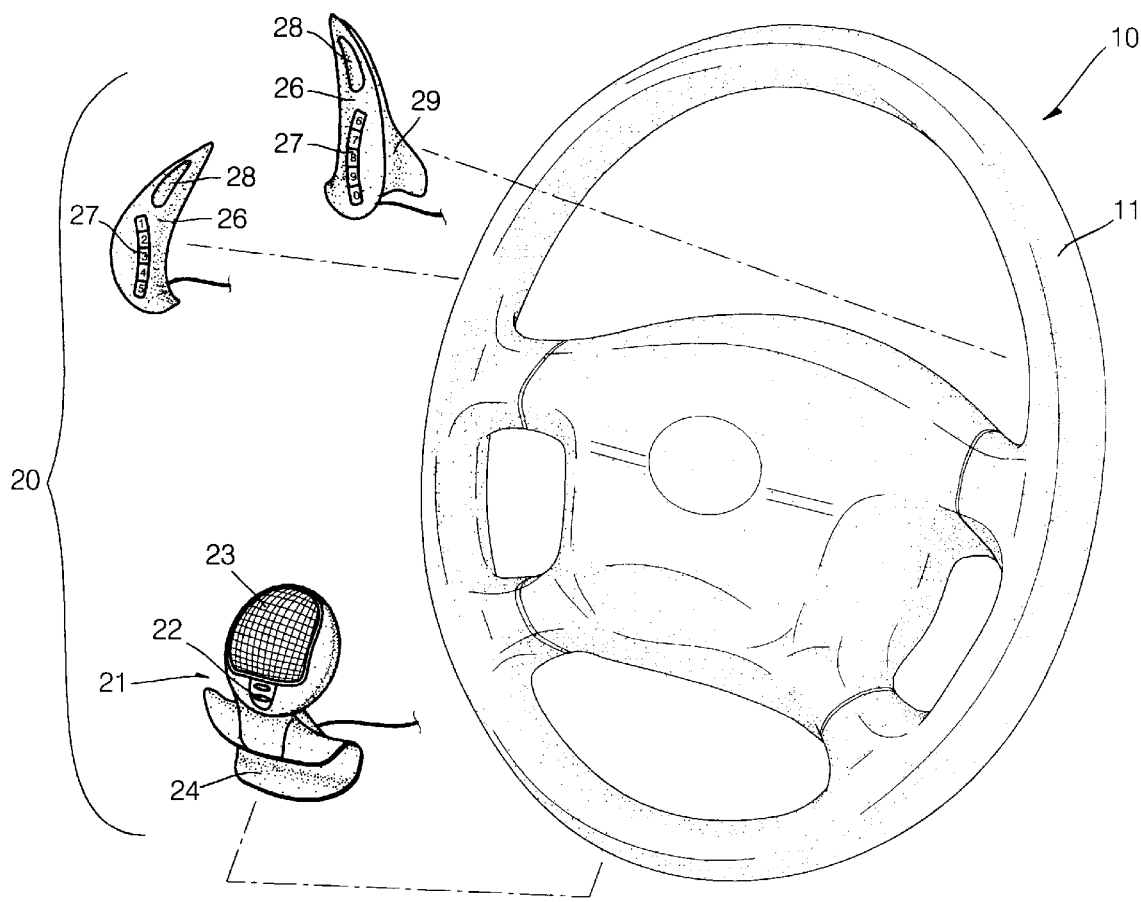
FIG. 2 is an exploded view of the dial communication system as shown in FIG. 1.
Figure 3:
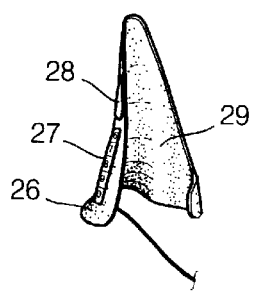
FIG. 3 is a perspective view of the dial member of the dial communication system as shown in FIG. 1.

Referring now to the drawings and initially to FIGS. 1–3, a dial communication system of a steering wheel of an automobile in accordance with the present invention comprises a steering wheel 10 having an annular frame 11, and a dial communication device 20 mounted on the annular frame 11 of the steering wheel 10 and including a dialogue member 21 and two dial members 26 each secured on the annular frame 11 of the steering wheel 10.

By such an arrangement, the dial communication device 20 is installed on the steering wheel 10 so that a driver's one hand holding the steering wheel 10 can synchronously operate the dialogue member 21 and the dial member 26 of the dial communication device 20 to perform functions of dial and dialogue.

The dialogue member 21 and the dial member 26 of the dial communication device 20 are separated from each other. Alternatively, the dialogue member 21 and the dial member 26 can be integrally formed with each other.

The dialogue member 21 includes a curved first snap holder 24 integrally secured on the steering wheel 10 for securing the dialogue member 21 to the annular frame 11 of the steering wheel 10. The dialogue member 21 also includes a microphone 22, and a loud speaker 23 so that the driver can face the steering wheel 10 to perform a dialogue function without having to hold a transmitter or a receiver.

The dial member 26 includes a curved second snap holder 29 integrally secured on the steering wheel 10 for securing the dial member 26 to the annular frame 11 of the steering wheel 10. The dial member 26 also includes a plurality of serially arranged dial press buttons 27, and a control button 28 so that driver holding the steering wheel 10 can synchronously press the press buttons 27 and the control button 28 by his fingers so as to perform a dial function.

The separate dial members 26 are respectively and symmetrically mounted on the two sides of the annular frame 26 of the steering wheel 10 without influencing the fluent operation of the steering wheel 10 whereby when the driver holds the steering wheel 10, he can synchronously press the press buttons 27 and the control button 28 of the two dial members 26 by his two thumbs so as to perform the dial function without affecting the operation of the steering wheel 10 so as to assure the driver's safety during driving the steering wheel 10. In addition, the dial communication device 20 mates with the steering wheel 10, thereby satisfying the ergonomical requirements for the driver.

Figure 4:
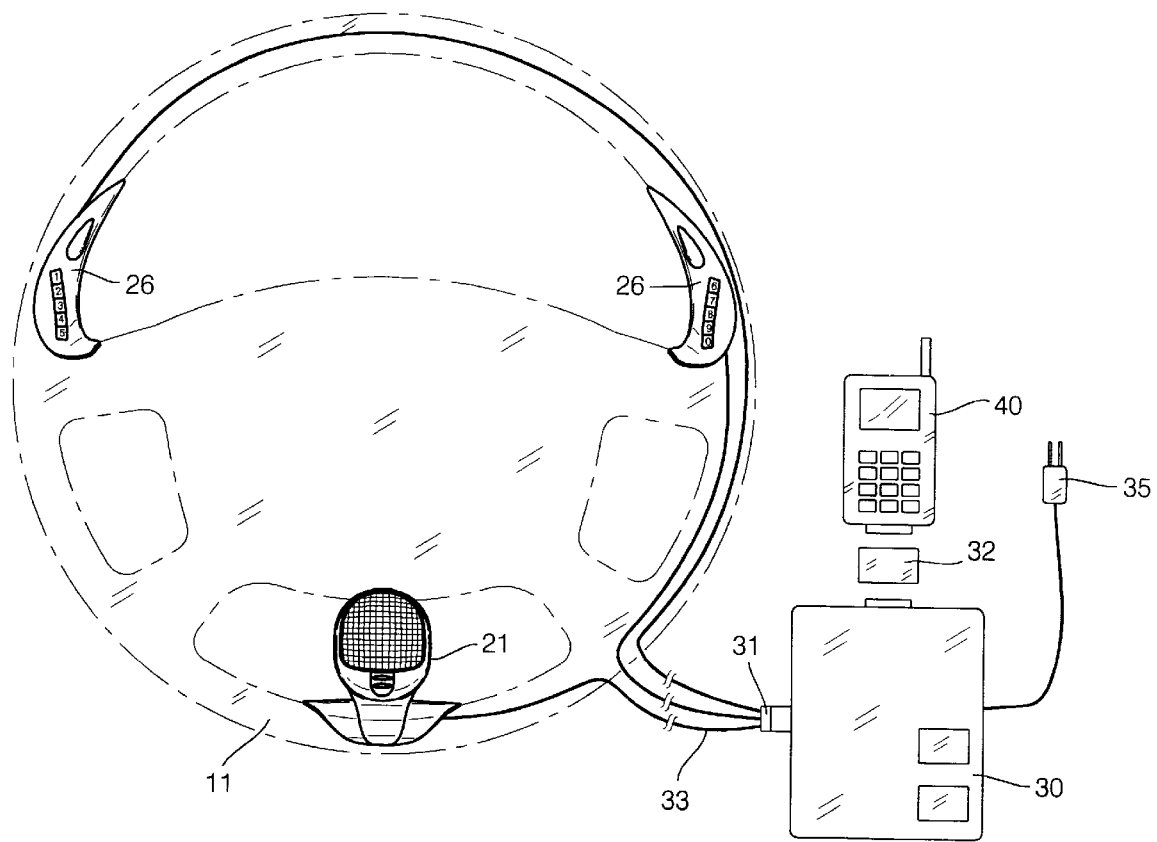
FIG. 4 is a schematic view of the dial communication system which is assembled to a main frame.

As shown in FIG. 4, the dial communication device 20 is connected to a main frame 30 by wires 33 and connection terminals 31. Alternatively, the dial communication device 20 can also be connected to the main frame 30 in a wireless manner.

The main frame 30 is connected to a plug 35 which is inserted into the cigarette lighter on the front panel of the automobile for providing the power supply. The main frame 30 includes a signal processing circuit (not shown) which is used for magnifying audio signals and processing signals.

The main frame 30 can be connected to a mobile telephone 40 through an interface card 32, thereby integrally assembling and constructing a communication device in the automobile without holding a receiver.

In practice, the dial communication device 20 is installed on the steering wheel 10 whereby the driver can hold the steering wheel 10, and can synchronously press the press buttons 27 and the control button 28 so as to perform the dial function so that the driver's hand does not have to leave the steering wheel 10 for performing the dial function, thereby greatly enhancing the safety during driving the steering wheel 10.

In addition, the dial communication device 20 is matingly installed on the steering wheel 10, thereby satisfying the ergonomical requirements for the driver.

Further, the dialogue member 21 and the dial member 26 of the dial communication device 20 are matingly installed on the annular frame 11 of the steering wheel 10 without influencing the operation of the steering wheel 10, thereby increasing the convenience of communication, and simultaneously assuring the driver's safety.

It should be clear to those skilled in the art that further embodiments may be made without departing from the scope of the present invention.

What is claimed is:

1. A dial communication system of a steering wheel of an automobile comprising:

a steering wheel (10) having an annular frame (11); and a dial communication device (20) mounted on said annular frame (11) of said steering wheel (10) and including a dialogue member (21) and a dial member (26) each secured on said annular frame (11) of said steering wheel (10);

wherein, said dial communication device (20) is installed on said steering wheel (10) so that a driver's one hand holding said steering wheel (10) can synchronously operate said dialogue member (21) and said dial member (26) of said dial communication device (20) to perform functions of dial and dialogue;

said dial communication device (20) is connected to a main frame (30); and said main frame (30) is connected to a mobile telephone (40) through an interface card (32).

2. The dial communication system in accordance with claim 1, wherein said dialogue member (21) and said dial member (26) of said dial communication device (20) are separated from each other.

3. The dial communication system in accordance with claim 1, wherein said dialogue member (21) includes a curved first snap holder (24) integrally secured on said steering wheel (10), and said dial member (26) includes a curved second snap holder (29) integrally secured on said steering wheel (10).

4. The dial communication system in accordance with claim 1, wherein said dialogue member (21) includes a microphone (22), and a loud speaker (23).

5. The dial communication system in accordance with claim 1, wherein said dial member (26) includes a plurality of serially arranged dial press buttons (27), and a control button (28).

* * * * *